(12) United States Patent
Wijnands et al.

(10) Patent No.: US 7,668,116 B2
(45) Date of Patent: Feb. 23, 2010

(54) ROOT NODE SHUTDOWN MESSAGING FOR MULTIPOINT-TO-MULTIPOINT TRANSPORT TREE

(75) Inventors: Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 11/822,448

(22) Filed: Jul. 6, 2007

(65) Prior Publication Data
US 2009/0010272 A1 Jan. 8, 2009

(51) Int. Cl.
*H04L 12/28* (2006.01)

(52) U.S. Cl. .................. 370/254; 370/255; 370/256; 370/390; 370/432; 709/208; 709/238

(58) Field of Classification Search ................. None
See application file for complete search history.

(56) References Cited

U.S. PATENT DOCUMENTS

| 2005/0259597 | A1* | 11/2005 | Benedetto et al. | 370/254 |
| 2007/0104120 | A1* | 5/2007 | Shah-Heydari | 370/256 |
| 2007/0153790 | A1* | 7/2007 | Boers et al. | 370/390 |
| 2007/0177525 | A1* | 8/2007 | Wijnands et al. | 370/254 |
| 2008/0273474 | A1* | 11/2008 | Yanagihara | 370/256 |

OTHER PUBLICATIONS

Brockners et al., "Label Distribution Protocol Extensions for Half-Duplex Multipoint-to-Multipoint Label Switched Paths", <draft-brockners-ldp-half-duplex-mp2mp-00.txt>, Network Working Group, Internet Draft, Feb. 26, 2007, pp. 1-21.
Minei et al., "Label Distribution Protocol Extensions for Point-to-Multipoint and Multipoint-to-Multipoint Label Switched Paths" <draft-ietf-mpls-ldp-p2mp-02>, Network Working Group, Internet Draft, Jun. 2006, pp. 1-23.
Rosen et al., "Multiprotocol Label Switching Architecture", Network Working Group, Request for Comments: 3031, Jan. 2001, pp. 1-61.
Andersson et al., "LDP Specification", Network Working Group, Request for Comments: 3036, Jan. 2001, pp. 1-133.

* cited by examiner

*Primary Examiner*—Robert W Wilson
(74) *Attorney, Agent, or Firm*—Leon R. Turkevich (57) ABSTRACT

In one embodiment, a method comprises registering, by a first label switching router having been identified as a root of a prescribed transport tree for transport of a prescribed group of data packets, at least two next hop label switching routers as belonging to the prescribed transport tree based on receiving respective label mapping messages; detecting by the first label switching router a prescribed condition indicating the first label switching router is to be removed from service as the root of the prescribed transport tree; and outputting, by the first label switching router, label distribution protocol messages for the prescribed transport tree to each of the next hop label switching routers determined as belonging to the prescribed transport tree, each label distribution protocol message indicating the first label switching router is to be removed from the service as the root of the prescribed transport tree.

20 Claims, 5 Drawing Sheets

ROOT NODE SHUTDOWN MESSAGING FOR MULTIPOINT-TO-MULTIPOINT TRANSPORT TREE

TECHNICAL FIELD

The present disclosure generally relates to implementing root node redundancy for multipoint-to-multipoint network label switched paths within multipoint-to-multipoint transport trees.

BACKGROUND

The Internet Engineering Task Force (IETF) Request for Comments (RFC) 3031 specifies a multiprotocol label switching (MPLS) architecture. The MPLS architecture in RFC 3031 permits packets entering a network to be assigned by an ingress router to a prescribed "Forwarding Equivalence Class" (FEC): once a packet has been assigned to a specific FEC (identifiable by a "label" added to the packet), the packet can be forwarded with its corresponding assigned label to a next hop label switching router (LSR). The next hop LSR can use the label supplied with the packet as an index to locate a forwarding table entry that specifies the next hop, and a new label used by the corresponding next hop LSR for the corresponding FEC and which replaces the label in the received packet. Hence, the next hop LSR replaces the label in the received packet with its new label, and forwards the packet on the next hop specified in the table, resulting in forwarding the packet via a label switched path (LSP) without the necessity of executing other routing algorithms based on parsing the network layer protocol header (e.g., the Internet Protocol (IP) header). RFC 3036 specifies a label distribution protocol (LDP) that enables label switching routers to exchange label bindings, enabling the label switching routers to map network-layer routing information directly to data-link layer switched paths.

The Internet Draft by Minei et al., "Label Distribution Protocol Extensions for Point-to-Multipoint and Multipoint-to-Multipoint Label Switched Paths," draft-ietf-mpls-ldp-p2mp-02, June 2006, describes extensions to the label distribution protocol specified in RFC 3036 for establishing multipoint-to-multipoint LSPs between label switching routers having established a tree topology with a single root and one or more leaf nodes, where the leaf nodes can operate as ingress nodes for inserting traffic into a network, and/or egress nodes for outputting traffic from the network, without requiring use of any multicast routing protocol within the network. In contrast, a point-to-multipoint LSP has one ingress label switching router and one or more egress label switching routers, and a multipoint-to-point LSP has one or more ingress label switching routers and one unique egress label switching router.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises registering, by a first label switching router having been identified as a root of a prescribed transport tree for transport of a prescribed group of data packets, at least two next hop label switching routers as belonging to the prescribed transport tree based on receiving respective label mapping messages, each label mapping message specifying a prescribed identifier of the prescribed transport tree, and a corresponding label used by the corresponding next hop label switching router for identifying the data packets assigned to the prescribed transport tree; detecting by the first label switching router a prescribed condition indicating the first label switching router is to be removed from service as the root of the prescribed transport tree; and outputting, by the first label switching router, label distribution protocol messages for the prescribed transport tree to each of the next hop label switching routers determined as belonging to the prescribed transport tree, each label distribution protocol message indicating the first label switching router is to be removed from the service as the root of the prescribed transport tree, enabling the label switching routers within the prescribed transport tree to join an alternate root node of a corresponding alternate transport tree, for transport of the data packets via the alternate transport tree.

In another embodiment, a method comprises registering, by a first label switching router in a prescribed transport tree for transport of a prescribed group of data packets, with an identified root of the transport tree based on outputting, to a next hop label switching router providing reachability to the identified root, a label mapping message specifying a prescribed identifier of the transport tree and a corresponding label used by the first label switching router in identifying the data packets assigned to the prescribed transport tree; receiving from the next hop label switching router a label distribution message indicating that the identified root of the transport tree is to be removed from service; and selecting a second identified root of a second prescribed transport tree, prior to the identified root of the transport tree being removed from service, for transport of the prescribed group of data packets via the second prescribed transport tree.

In yet another embodiment, a method comprises receiving, by a first label switching router, a first label mapping message from at least one downstream next-hop label switching router, the label mapping message specifying a prescribed identifier of a prescribed transport tree having a prescribed root and configured for transport of a prescribed group of data packets, the label mapping message further specifying a first label used by the corresponding downstream next-hop label switching router for identifying the data packets assigned to the prescribed transport tree; registering, by the first label switching router, the downstream next-hop label switching router as belonging to the prescribed transport tree based on adding a link identifier for reaching the downstream label switching router, and the corresponding first label, to a forwarding table entry specifying a second label used by the first label switching router in identifying the data packets assigned to the prescribed transport tree; registering, by the first label switching router, with the prescribed root of the prescribed transport tree based on outputting, to an upstream next-hop label switching router providing reachability to the prescribed root, a second label mapping message specifying the prescribed identifier of the prescribed transport tree and the second label; receiving, by the first label switching router, from the upstream next-hop label switching router a label distribution message indicating that the prescribed root of the prescribed transport tree is to be removed from service; and outputting, by the first label switching router, to each downstream next-hop label switching router belonging to the prescribed transport tree, an updated label distribution message indicating that the prescribed root of the prescribed transport tree is to be removed from service, enabling each downstream next-hop label switching router to join an alternate root node of a corresponding alternate transport tree, for transport of the data packets via the alternate transport tree.

DETAILED DESCRIPTION

Particular embodiments enable a root node of a multipoint-to-multipoint transport tree to send label distribution protocol messages for its multipoint-to-multipoint transport tree, in order to notify the label switching routers within the transport tree that an alternate root node for an alternate transport tree needs to be selected. In particular, the particular embodiments expand upon the use of root node redundancy as described in commonly-assigned, copending application Ser. No. 11/346,411, filed Feb. 2, 2006 by Wijnands et al., entitled "Root Node Redundancy for Multipoint-to-Multipoint Transport Trees".

The particular embodiments disclosed herein enable the root node to output label distribution protocol messages indicating that the root node is to be removed from service as the root of the prescribed multipoint-to-multipoint transport tree, also referred to as root shutdown messages, as identified by the corresponding transport tree identifier (e.g., the FEC element). Further, the root node outputs the root shutdown messages preferably with sufficient time to enable the leaf nodes in the transport tree to select the alternate redundant root node having its redundant transport tree for transport of the same prescribed group of data packets as classified with the original Forwarding Equivalence Class.

Hence, the particular embodiments can enable a root node to proactively cause its leaf nodes to select the alternate root node, prior to the root node being removed from service (e.g., due to maintenance, etc.), ensuring that there is no loss of any data packets that normally would occur if the leaf nodes needed to transfer to the alternate root node upon detection of a failed condition in the root node.

Figure 1:
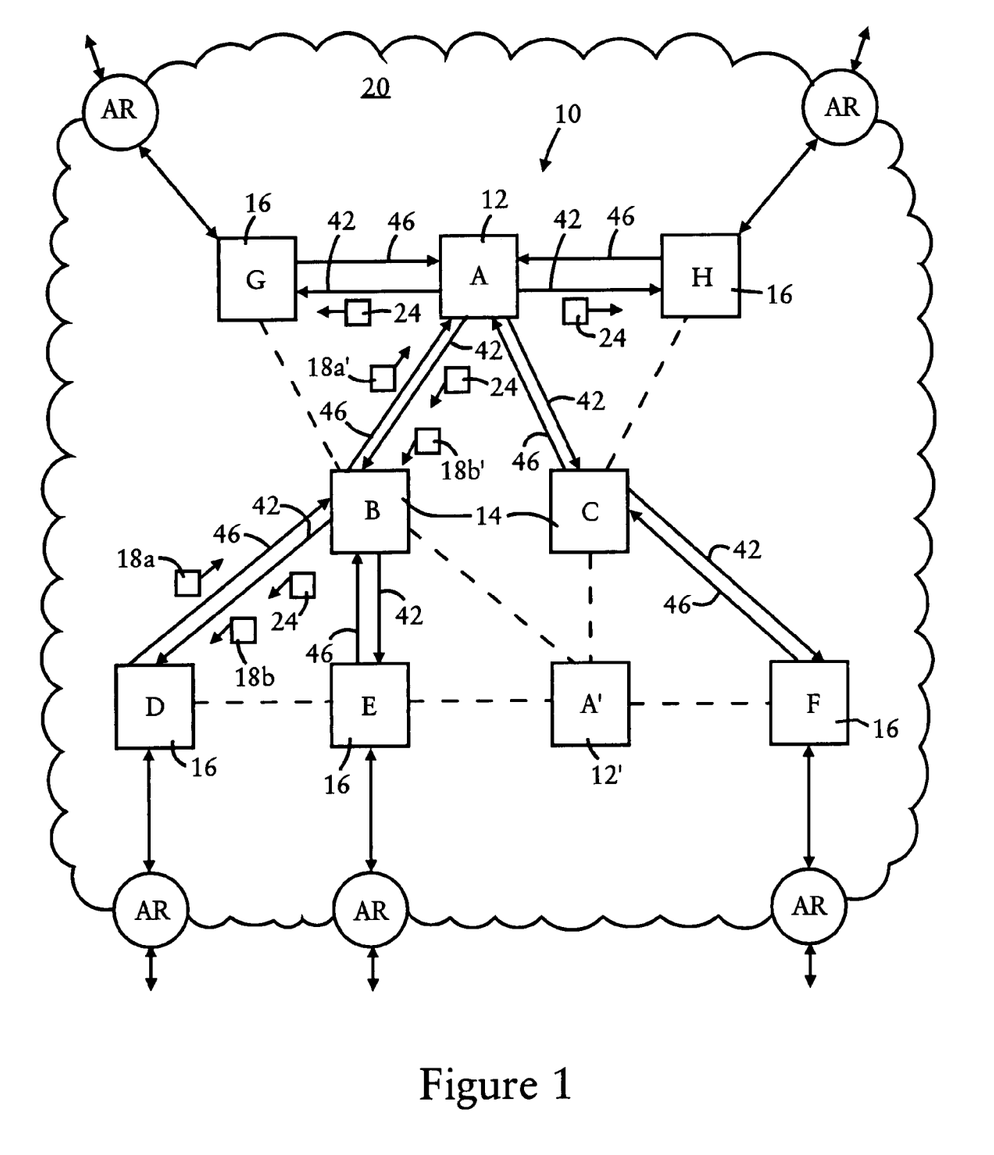
FIG. 1 illustrates an example multipoint-to-multipoint network having label switching routers for forwarding packets according to a first transport tree having a root node, according to an example embodiment.
Figure 2:
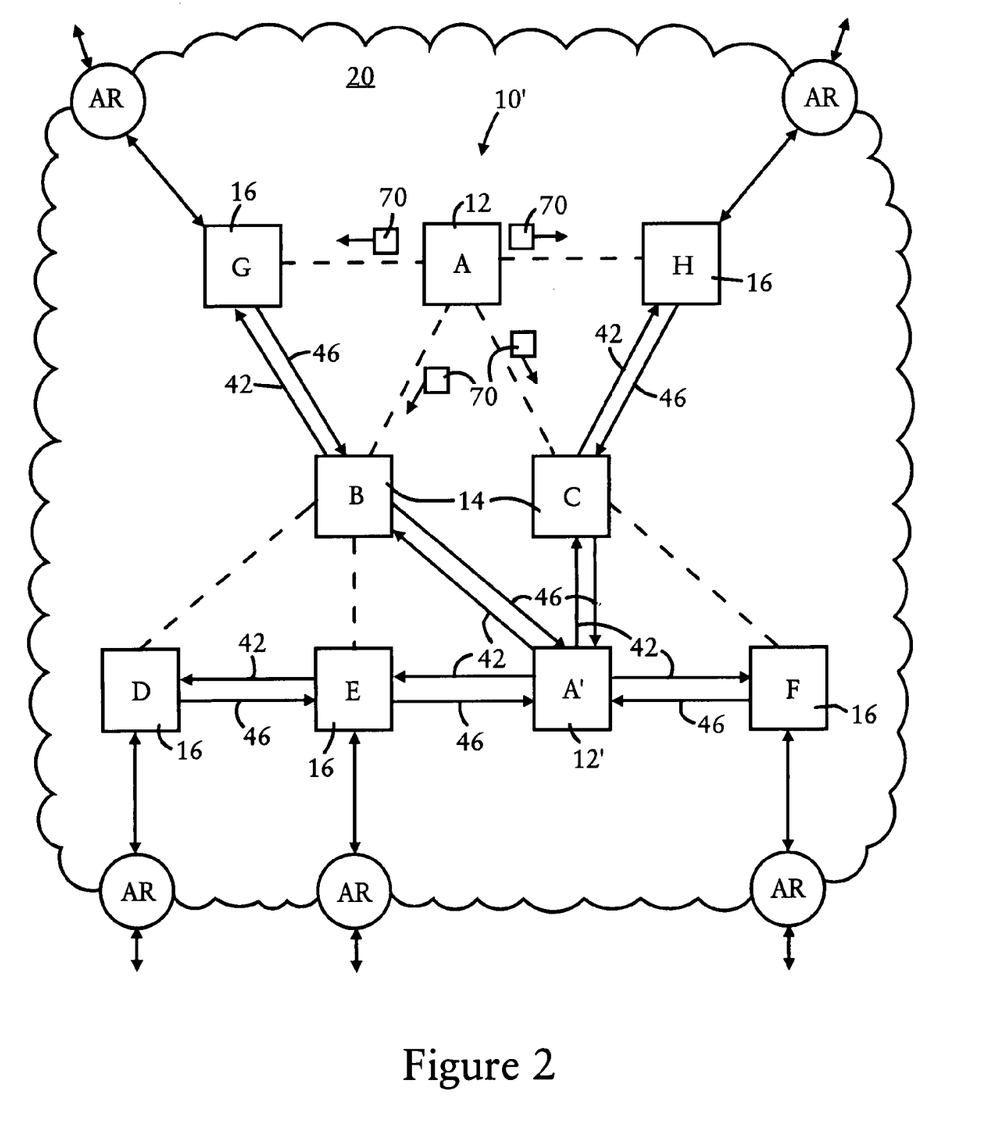
FIG. 2 illustrates an example multipoint-to-multipoint network having the label switching routers of FIG. 1 selecting a second transport tree for forwarding packets using a corresponding alternate root node, according to an example embodiment.

FIGS. 1 and 2 illustrate example multipoint-to-multipoint transport trees 10 and 10' composed of label switching routers (LSRs) that can be implemented as either root nodes 12 and 12', intermediate nodes 14, or leaf nodes 16. The transport trees 10 and 10' each can implement a multiprotocol label switching architecture, for example according to RFC 3031, for the transport of data packets assigned to a given forwarding equivalence class (FEC). Each of the transport trees 10 and 10' can be established according to existing Label Distribution Protocol (LDP) protocols, based on the exchange of label mapping messages 18 (e.g., downstream label mapping messages 18a and/or upstream label mapping messages 18b) described below. Each of the transport trees 10 and 10' also are configured for transporting the same class of data packets for the corresponding FEC using label switched paths 42 and 46, described below (the dashed lines in FIGS. 1 and 2 indicate data links not in use by the corresponding transport tree 10 or 10'). Hence, the root nodes 12 and 12' provide root node redundancy for the transport of data packets via the network 20 between ingress and egress points 22 (e.g., access routers (AR)). The term "upstream" refers to ingress traffic from a leaf node 16 and destined toward the root node 12, and nodes that are relatively closer to the root node 12. The term "downstream" refers to traffic forwarded from a root node 12 and destined toward a leaf node 16, and nodes that are relatively further from the root node 12.

Each root node 12 and 12' can be configured for detecting a prescribed condition indicating that the root node is to be removed from service as the corresponding root, for example based on detecting initiation of a prescribed shutdown procedure within its operating system, or based on detecting another software or hardware-based attribute indicating that operations are to be at least temporarily suspended. Hence, each root node 12 and 12' can be configured for responding to the detected condition indicating removal from service by outputting to the each of the label switching routers 14 or 16 a root shutdown message 24 indicating to the label switching routers 14 or 16 that the alternate root node should be selected for continued transport of the data packets via the alternate transport tree that satisfy the condition of the prescribed FEC.

Figure 3:
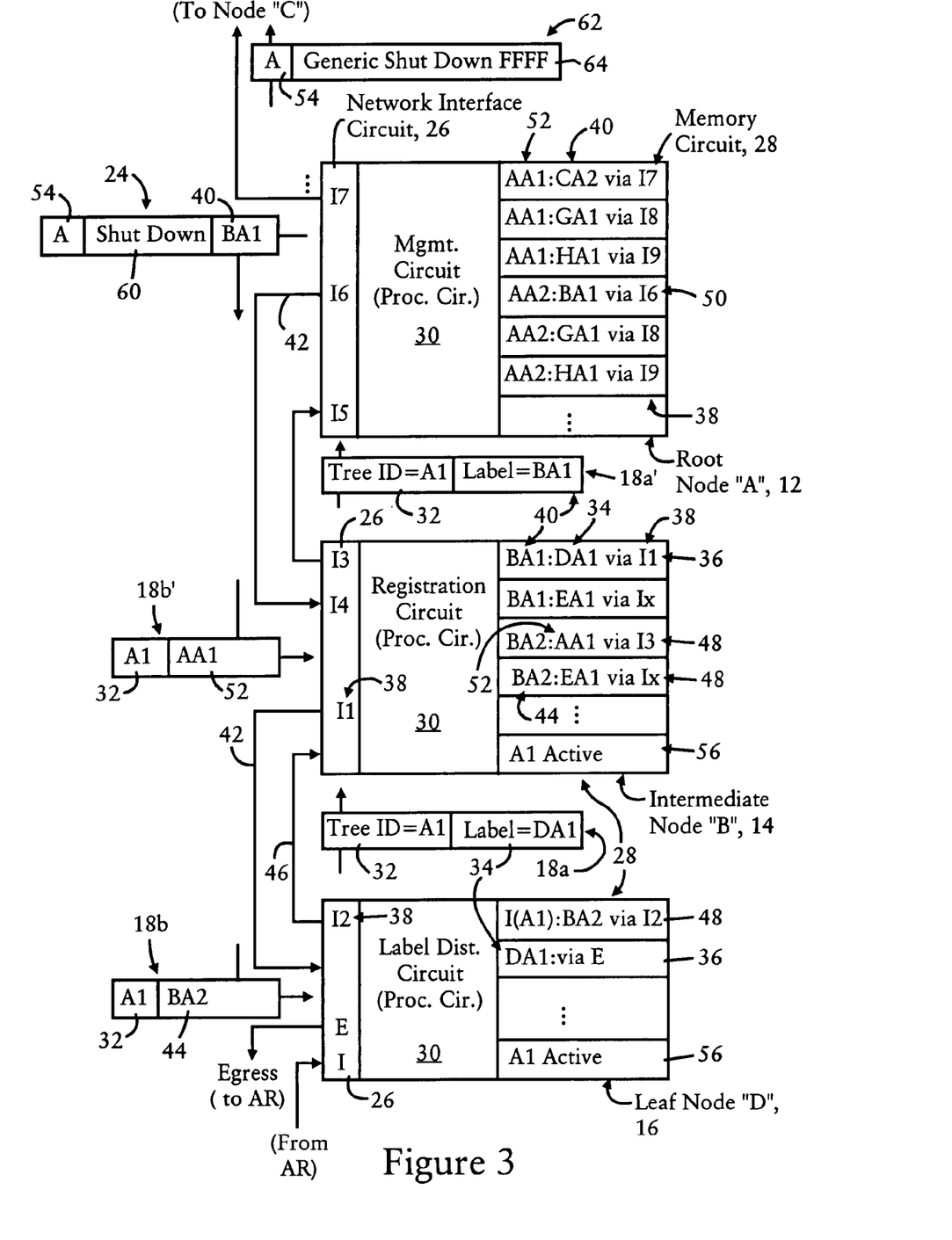
FIG. 3 illustrates an example message flow between example label switching routers of FIGS. 1 and 2.

FIG. 3 illustrates example messages exchanged between the leaf node 16, an intermediate node 14, and a root node 12 in establishing the prescribed transport tree, and initiating root node shutdown based on processing of root shutdown messages, according to an example embodiment. Each root node 12 (including the corresponding redundant root node 12'), intermediate node 14, and leaf node 16 includes a network interface circuit 26, a memory circuit 28, and a processing circuit 30. As illustrated in FIG. 3, the processing circuits 30 also can be configured based on operations as a root node 12, an intermediate node 14, and/or a leaf node 16; hence, the processing circuits 30 also can be described as a management circuit in the root node 12, a registration circuit in the intermediate node 14, and a label distribution circuit 30 in the leaf node 16.

Any of the disclosed circuits of the label switching routers 12, 14, or 16 (including the network interface circuit 26, the memory circuit 28, the processor circuit 30, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor such as a microprocessor circuit (not shown), where execution of executable code stored in an internal memory circuit (e.g., within the memory circuit 28) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 28 can be implemented, for example, using a non-volatile memory such as a programmable read only memory (PROM) or an EPROM, and/or a volatile memory such as a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer). Any reference to "outputting a message" or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 4A:
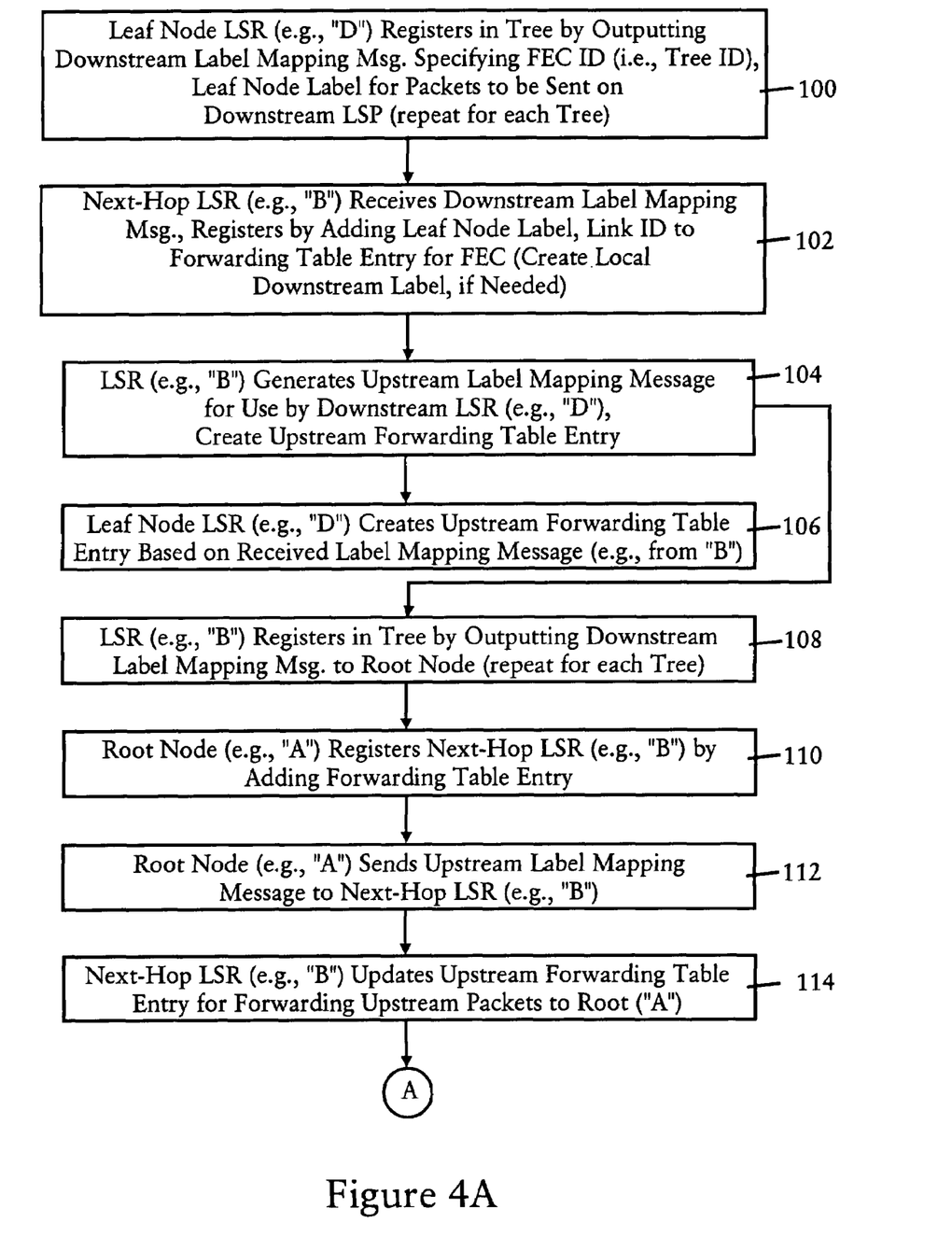
FIGS. 4A and 4B illustrates an example method by the label switching routers of FIGS. 1-3, according to an example embodiment.
Figure 4B:
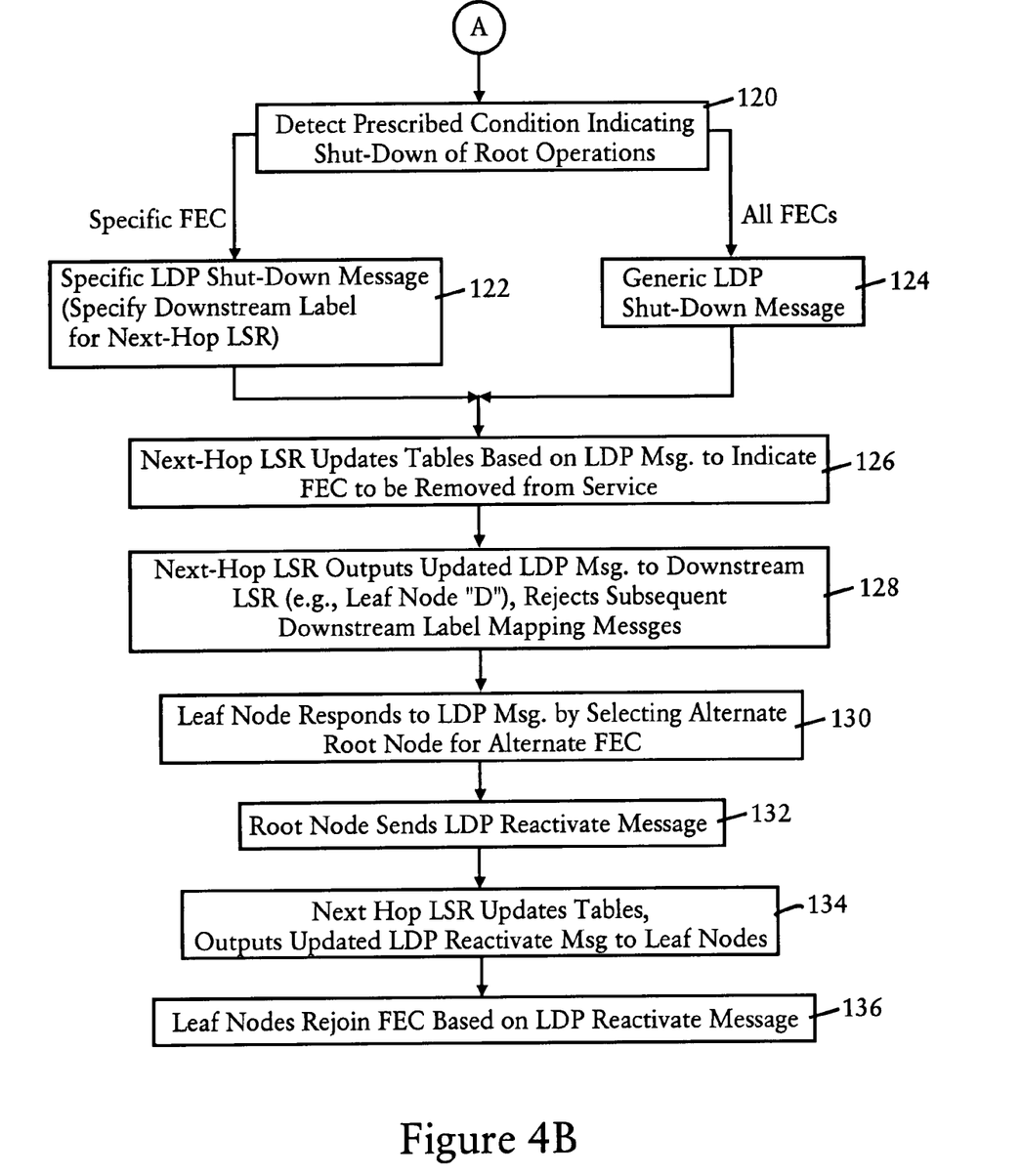

FIGS. 4A and 4B illustrate an example method by the label switching routers of FIGS. 1-3, according to an example embodiment. The steps described in FIGS. 4A and 4B can be implemented as executable code stored on a computer readable medium (e.g., floppy disk, hard disk, ROM, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Each of the multipoint-to-multi-point transport trees 10 and 10' are formed based on the label distribution circuit 30 in each of the leaf nodes (e.g., "D") 16 registering in the corresponding transport tree (e.g., 10) by generating and the corresponding network interface circuit 26 outputting and outputting in step 100 a downstream label mapping message 18*a* to its corresponding upstream next-hop router (e.g., "B") 14. The corresponding upstream next-hop router (e.g., "B") 14 can provide reachability for the leaf node (e.g., "D") 16 to the identified root (e.g., "A") 12. Each of the label switching routers can discover each other using prescribed discovery protocols, for example Open Shortest Path First (OSPF) or Interior Gateway Protocol (IGP). As illustrated in FIG. 3, each downstream label mapping message (e.g., 18*a*) generated by the label distribution circuit 30 specifies a prescribed identifier ("A1") 32 of the prescribed transport tree (i.e., FEC identifier) (e.g., 10), and a corresponding label 34 that is used by the label switching router 16 outputting the corresponding label mapping message (e.g., "DA1") in identifying the downstream data packets assigned to the prescribed transport tree (e.g., 10).

The registration circuit 30 in the upstream next-hop router (e.g., an intermediate node 14 or a root node 12), for example the intermediate node "B" 14 of FIGS. 1 and 3, in response to the network interface circuit 26 receiving the downstream label mapping message 18*a*, registers in step 102 the downstream next-hop label switching router, illustrated in FIGS. 1 and 3 as the leaf node (e.g., "D") 16, based on creating (or updating) a downstream forwarding table entry 36 that specifies the label 34 used by the corresponding downstream next-hop label switching router 16, a link identifier (e.g., "11") 38 used by the intermediate label switching router "B" 14 for reaching the downstream label switching router (e.g., "D") 16, and a corresponding downstream label (e.g., "BA1") 40 created the upstream next-hop router "B" 14 for identifying any downstream data packets from the next-hop upstream node (e.g., root node 12) assigned to the transport tree (e.g. 10). Hence, the downstream forwarding table entry 36 enables the intermediate node "B" 14 to establish a downstream label switched path (LSP) 42 for sending data packets belonging to the corresponding FEC to the leaf node "D" 16.

The registration circuit 30 of the intermediate label switching router (e.g., "B") 14 also responds to the received downstream label mapping message 18*a* by generating in step 104, for output to the leaf node "D" via the network interface circuit 26 an upstream label mapping message 18*b*. The upstream label mapping message 18*b* specifies the corresponding tree identifier ("A1") 32 and a corresponding upstream label (e.g., "BA2") 44 to be used by the leaf node "D" 16 in sending data packets upstream toward the root 12 using the upstream LSP 46 established by the upstream label mapping message 18b. The intermediate label switching router (e.g., "B") 14 also creates in step 104 upstream forwarding table entries 48, described below.

Hence, the leaf node 16 is able to forward ingress packets into the transport tree 10 based on creating in step 106 the upstream forwarding table entry 48 based on receiving the upstream label mapping message 18*b*. The leaf node 16 also is able to forward packets received via the downstream LSP as egress packets to the corresponding access router (AR) based on the corresponding downstream forwarding table entry 36 established by the corresponding processing circuit 30 during transmission of the downstream label mapping message 18*a*.

The intermediate node "B" 14 also registers with the prescribed root ("A") 12 of the corresponding tree (e.g., 10') by outputting via its corresponding network interface circuit 26 a corresponding downstream label mapping message 18*a*' to its upstream next-hop label switching router, namely the root node "A" 12 in step 108. As illustrated in FIG. 3, the label mapping message 18*a*' specifies the tree identifier 32, and the corresponding label 40 used by the intermediate node "B" 14 for identifying downstream packets belonging to the FEC and that are transported via the transport tree 10. In response, the management circuit 30 in the root node 12 adds in step 110 a forwarding table entry 50 that registers the intermediate node "B" 14 for downstream data packets that are assigned to the transport tree 10. As illustrated in FIG. 3, the memory circuit 28 of the root node 12 includes multiple downstream forwarding table entries based on multiple next hop label switching routers (e.g., "C", "G", and "H") also registering with the root node 12 based on sending similar downstream label mapping messages 18*a* to the root node 12.

The management circuit 30 of the root node 12 also generates, for each received downstream label mapping message 18*a*, a corresponding upstream label mapping message 18*b*' in step 112 to the corresponding next-hop downstream LSR. The upstream label mapping message 18' specifies the tree identifier 32 for the corresponding FEC, and a corresponding upstream label 52 to be used by the corresponding next-hop downstream node (e.g., "B") 14 in sending messages upstream to the root node 12. As illustrated in FIG. 3, the root node 12 can generate multiple forwarding table entries that identify, for a given upstream label 52 assigned to a corresponding next-hop downstream label switching router, the downstream labels 40 that should be used for forwarding received data packets to the next hop destinations for implementation of the multipoint-to-multipoint tree 10, and the respective interface identifiers within the corresponding network interface circuit 26.

The intermediate node (e.g., "B"), in response to receiving the upstream label mapping message 18*b*', updates in step 114 its upstream forwarding table entry 48 in order to enable forwarding of upstream packets to the root node 12, as well as any other downstream nodes that may have registered with the intermediate node "B" (e.g., the LSR "E" having registered using the label map "EA1").

Hence, each of the label switching routers 12, 14 and 16 are able to distribute data packets assigned to the FEC via the multipoint-to-multipoint transport tree 10. As apparent from the foregoing, the above steps described in FIG. 4A can be repeated by each of the label switching routers for the redundant root node 12' in establishing the alternate transport tree 10'. Hence, each of the label switching routers 14 and 16 can have concurrent registrations with the root nodes 12 and 12' of the respective transport trees 10 and 10'.

Referring to FIG. 4B, assume that the management circuit 30 of the root node 12 detects in step 120 a prescribed condition indicating that the root node 12 is to be removed from service as the root node of the corresponding transport tree 10. For example, the management circuit 30 can detect that the label switching router is to be removed from service based on an administrator request from a network manager to halt service for the specific FEC serviced by the transport tree 10, a detected shutdown of the associated operating system executed by the management circuit 30, etc.

In response to detecting the prescribed condition indicating the label switching router is to be removed from service as a root 12 of the corresponding transport tree 10, the management circuit 30 can generate and output via the corresponding network interface circuit 26 in step 122 a shutdown message 24 for the specific FEC in the form of a label distribution protocol (LDP) message. The shutdown message 24 can specify for example the network address 54 of the root node 12, a shutdown command 60, and the corresponding label 40 used by the downstream next-hop label switching router (e.g., "B"); alternately, the shutdown message 24 also can specify the tree identifier 32. Alternately, in response to detecting a generic shutdown that all FECs administered by the root 12 are to be shut down, the management circuit 30 can output via the corresponding network interface circuit 26 in step 124 a generic shutdown message 62, illustrated in FIG. 3, which can specify the address 54 of the root node 12, and a generic shutdown command 64.

Each of the next hop downstream label switching routers (e.g., the intermediate nodes "B", "C" 14 and the root nodes "G" and "H"), in response to receiving either the shutdown message 60 or 62 via its corresponding network interface circuit 26, can update their respective tables to indicate that the root node 12 in the corresponding transport tree 10 is to be removed from service. For example, the registration circuit 30 of the intermediate node "B" 14 can update in step 126 its upstream forwarding tables 48 and a transport tree status field 56 to specify that the root node 12 for the corresponding transport tree 10 is no longer available for service; the registration circuit 30 of the intermediate node "B" also can set an internal flag indicating the corresponding tree identifier 32 is unusable. The registration circuit 30 of the intermediate node also outputs in step 128 updated LDP shutdown messages 24 or 62 to the associated downstream label switching routers (e.g., the leaf node "D" 16), to indicate that the root 12 of the corresponding transport tree 10 is to be removed from service. Hence, the label distribution circuit 30 in each leaf node 16 can respond in step 130 to the received LDP shutdown message 24 or 62 received via its corresponding network interface circuit 26 by noting that the corresponding FEC (identified by the corresponding tree identifier 32) is unusable by updating its corresponding transport tree status field 56, and by selecting the alternate root node 12' of the alternate transport tree 10', in order to begin forwarding packets via the alternate transport tree 10'.

Hence, each of the label switching routers in the network 20 can mark that the root node 12 of the corresponding transport tree 10 is unavailable for service in their respective transport tree status fields 56, causing all of the label switching routers in the network 22 stop using the transport tree 10, and begin using the alternate transport tree 10' having the alternate root node 12', before the root node 12 is actually removed from service. Hence, each of the label switching routers in the network 20 can switch over to the alternate transport tree 10' for the prior transport tree 10 is removed from service, ensuring that there is no packet loss.

Assume now in step 132 of FIG. 4B that the root node 12 of the transport tree 10 is able to resume service, for example following completion of the service, or for example in the case where the shutdown of the root 12 was not necessary. In this case, instead of relying upon existing routing protocols, the management circuit 30 can output in step 132 via its corresponding network interface circuit 26 an LDP reactivate message 70 via the existing links with the next hop label switching routers. The reactivate message 70 can specify that the root node 12 is reactivated for service as the root of the corresponding transport tree 10. Each of the next hop label switching routers respond in step 134 to the reactivate message 70 received via its corresponding network interface circuit 26 by updating their internal tables, and outputting updated LDP reactivate messages to the respective downstream next-hop label switching routers according to the transport tree 10. Hence, each of the leaf nodes 16 can rejoin in step 136 the original transport tree 10 serving the corresponding FEC, based on the received reactivate message 70 received via its corresponding network interface circuit 26.

According to the example embodiments, a root node of a multipoint-to-multipoint transport tree can notify leaf nodes that the root node will be shutdown from service, enabling the leaf nodes to join an alternate root node of an alternate transport tree for continued transport of data packets via the alternate transport tree, without any packet loss.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

registering, by a first label switching router having been identified as a root of a prescribed transport tree for transport of a prescribed group of data packets, at least two next hop label switching routers as belonging to the prescribed transport tree based on receiving respective label mapping messages, each label mapping message specifying a prescribed identifier of the prescribed transport tree and a corresponding label used by the corresponding next hop label switching router for identifying the data packets assigned to the prescribed transport tree;

detecting by the first label switching router a prescribed condition indicating the first label switching router is to be removed from service as the root of the prescribed transport tree; and outputting, by the first label switching router, label distribution protocol messages for the prescribed transport tree to each of the next hop label switching routers determined as belonging to the prescribed transport tree, each label distribution protocol message indicating the first label switching router is to be removed from the service as the root of the prescribed transport tree, enabling the label switching routers within the prescribed transport tree to join an alternate root node of a corresponding alternate transport tree, for transport of the data packets via the alternate transport tree.

2. The method of claim 1, wherein each label distribution protocol message, indicating the first label switching router is to be removed from the service as the root of the prescribed transport tree, includes a network address of the first label switching router, and the corresponding label used by the corresponding next hop label switching router for identifying the data packets assigned to the prescribed transport tree.

3. The method of claim 1, wherein each label distribution protocol message specifies an address of the first label switching router, and a generic transport tree identifier indicating that all transport trees having the first label switching router as the corresponding root are to be removed from service.

4. The method of claim 1, further comprising outputting, by the first label switching router, second label distribution protocol messages to each of the next hop label switching routers determined as belonging to the prescribed transport tree and following the label distribution protocol messages indicating the first label switching router is to be removed from the service as the root of the prescribed transport tree, each of the second label distribution protocol messages specifying the first label switching router is reactivated for the service as the root of the prescribed transport tree.

5. The method of claim 1, wherein the prescribed transport tree is implemented as a multipoint-to-multipoint label switched path.

6. An apparatus comprising:
a network interface circuit configured for receiving label mapping messages from respective next hop label switching routers, each label mapping message specifying a prescribed identifier of a prescribed transport tree for transport of a prescribed group of data packets, and a corresponding label used by the corresponding next hop label switching router for identifying the data packets assigned to the prescribed transport tree, the apparatus having been identified as a root of the prescribed transport tree; and
a management circuit configured for detecting a prescribed condition indicating the apparatus is to be removed from service as the root of the prescribed transport tree, the management circuit configured for generating, for output via the network interface circuit, a label distribution protocol message for the prescribed transport tree to each of the next hop label switching routers determined as belonging to the prescribed transport tree, the label distribution protocol message indicating the first label switching router is to be removed from the service as the root of the prescribed transport tree, enabling the label switching routers within the prescribed transport tree to join an alternate root node of a corresponding alternate transport tree, for transport of the data packets via the alternate transport tree.

7. The apparatus of claim 6, wherein each label distribution protocol message, indicating the first label switching router is to be removed from the service as the root of the prescribed transport tree, includes a network address of the first label switching router, and the corresponding label used by the corresponding next hop label switching router for identifying the data packets assigned to the prescribed transport tree.

8. The apparatus of claim 6, wherein each label distribution protocol message specifies an address of the first label switching router, and a generic transport tree identifier indicating that all transport trees having the first label switching router as the corresponding root are to be removed from service.

9. The apparatus of claim 6, wherein the management circuit further is configured for generating, for output by the network interface circuit, second label distribution protocol messages to each of the next hop label switching routers determined as belonging to the prescribed transport tree and following the label distribution protocol messages indicating the first label switching router is to be removed from the service as the root of the prescribed transport tree, each of the second label distribution protocol messages specifying the first label switching router is reactivated for the service as the root of the prescribed transport tree.

10. The apparatus of claim 6, wherein the prescribed transport tree is implemented as a multipoint-to-multipoint label switched path.

11. A method comprising:
registering by a first label switching router with an identified root of a prescribed transport tree providing transport of a prescribed group of data packets, the registering based on outputting a label mapping message to a next hop label switching router providing reachability to the identified root, the label mapping message specifying a prescribed identifier of the prescribed transport tree and a corresponding label used by the first label switching router in identifying the data packets assigned to the prescribed transport tree;
receiving from the next hop label switching router a label distribution message indicating that the identified root of the prescribed transport tree is to be removed from service; and
selecting a second identified root of a second prescribed transport tree, prior to the identified root of the prescribed transport tree being removed from service, for transport of the prescribed group of data packets via the second prescribed transport tree.

12. The method of claim 11, further comprising registering, by the first label switching router, in the second prescribed transport tree with the corresponding second identified root based on outputting a corresponding second label mapping message specifying a corresponding prescribed second identifier of the second prescribed transport tree and a corresponding second label used by the first label switching router in identifying the data packets assigned to the second prescribed transport tree, first label switching router having concurrent registrations with the prescribed transport tree and the second prescribed transport tree.

13. The method of claim 11, further comprising:
receiving from the next hop label switching router, following the label distribution message, a second label distribution message indicating that the identified root of the prescribed transport tree is reactivated for the service as the root of the prescribed transport tree; and
reselecting the identified root of the prescribed transport tree, following selection of the second identified root, for transport of the prescribed group of data packets via the prescribed transport tree.

14. The method of claim 11, wherein the prescribed transport tree is implemented as a multipoint-to-multipoint label switched path.

15. An apparatus comprising:
a label distribution circuit configured for generating a label mapping message for registration with an identified root of a prescribed transport tree providing transport for a prescribed group of data packets, the label mapping message specifying a prescribed identifier of the prescribed transport tree and a corresponding label used by the apparatus in identifying the data packets assigned to the prescribed transport tree; and
a network interface circuit configured for outputting the label mapping message to a next hop label switching router providing reachability to the identified root, the network interface circuit further configured for receiving from the next hop label switching router a label distribution message indicating that the identified root of the prescribed transport tree is to be removed from service;

the label distribution circuit further configured for selecting a second identified root of a second prescribed transport tree, prior to the identified root of the prescribed transport tree being removed from service, for transport of the prescribed group of data packets via the second transport tree.

16. The apparatus of claim 15, wherein the label distribution circuit further is configured for registering in the second prescribed transport tree with the corresponding second identified root based on generating a corresponding second label mapping message specifying a corresponding prescribed second identifier of the second prescribed transport tree and a corresponding second label used by the apparatus in identifying the data packets assigned to the second prescribed transport tree, apparatus having concurrent registrations with the prescribed transport tree and the second prescribed transport tree.

17. The apparatus of claim 15, wherein:
the network interface circuit is configured for receiving from the next hop label switching router, following the label distribution message, a second label distribution message indicating that the identified root of the prescribed transport tree is reactivated for the service as the root of the prescribed transport tree;
the label distribution circuit configured for reselecting the identified root of the prescribed transport tree, following selection of the second identified root, for transport of the prescribed group of data packets via the prescribed transport tree.

18. The apparatus of claim 15, wherein the prescribed transport tree is implemented as a multipoint-to-multipoint label switched path.

19. An apparatus comprising:
means for receiving label mapping messages from respective next hop label switching routers, each label mapping message specifying a prescribed identifier of a prescribed transport tree for transport of a prescribed group of data packets, and a corresponding label used by the corresponding next hop label switching router for identifying the data packets assigned to the prescribed transport tree, the apparatus having been identified as a root of the prescribed transport tree; and means for detecting a prescribed condition indicating the apparatus is to be removed from service as the root of the prescribed transport tree, the means for detecting further configured for generating, for output via the means for receiving, a label distribution protocol message for the prescribed transport tree to each of the next hop label switching routers determined as belonging to the prescribed transport tree, the label distribution protocol message indicating the label switching router is to be removed from the service as the root of the prescribed transport tree, enabling the label switching routers within the prescribed transport tree to join an alternate root node of a corresponding alternate transport tree, for transport of the data packets via the alternate transport tree.

20. An apparatus comprising:
means for generating a label mapping message for registration with an identified root of a prescribed transport tree providing transport for a prescribed group of data packets, the label mapping message specifying a prescribed identifier of the prescribed transport tree and a corresponding label used by the apparatus in identifying the data packets assigned to the prescribed transport tree; and means for outputting the label mapping message to a next hop label switching router providing reachability to the identified root, the means for outputting further configured for receiving from the next hop label switching router a label distribution message indicating that the identified root of the prescribed transport tree is to be removed from service;

the means for generating further configured for selecting a second identified root of a second prescribed transport tree, prior to the identified root of the prescribed transport tree being removed from service, for transport of the prescribed group of data packets via the second transport tree.

* * * * *